United States Patent [19]
Chou

[11] Patent Number: 5,641,418
[45] Date of Patent: Jun. 24, 1997

[54] PEN BASE ELECTRIC HEAT SEALER

[76] Inventor: Shu Hui Chou, 4 Fl., No. 276, Sec. 1, Tai Tung Rd., Hsi Chih Chen, Taipei Hsien, Taiwan

[21] Appl. No.: 229,957

[22] Filed: Dec. 3, 1993

Related U.S. Application Data

[63] Continuation-in-part of Ser. No. 80,762, Jun. 24, 1993, Pat. No. 5,374,806.
[51] Int. Cl.$^6$ .................... H05B 1/00; H05B 3/42
[52] U.S. Cl. ................... 219/229; 219/227; 219/233
[58] Field of Search ..................... 219/229, 221, 219/227, 233, 236–240; 156/579; 401/1, 2, 208, 209; 606/28–31; 607/145, 146

[56] References Cited

U.S. PATENT DOCUMENTS

| | | | |
|---|---|---|---|
| Re. 8,282 | 6/1878 | Eaton | 219/233 |
| 1,036,165 | 8/1912 | Tongue | 156/579 |
| 1,455,842 | 5/1923 | Kelly | 219/240 |
| 1,656,690 | 1/1928 | Blackburn | 219/240 |
| 1,744,720 | 1/1930 | Blackburn | 219/240 |
| 1,820,895 | 8/1931 | Weber | 401/1 |
| 1,850,280 | 3/1932 | Haynes | 219/227 |
| 2,030,285 | 2/1936 | Dinyer | 219/239 |
| 2,173,380 | 9/1939 | Tharp | 219/240 |
| 2,430,920 | 11/1947 | Dodge | 156/579 |
| 2,476,612 | 7/1949 | Lobdell | 219/240 |
| 2,598,900 | 6/1952 | Frye | 219/237 |
| 2,709,742 | 5/1955 | Perry | 156/579 |
| 2,735,797 | 2/1956 | Schjeldahl | 156/251 |
| 2,768,272 | 10/1956 | Lesher | 156/579 |
| 2,814,710 | 11/1957 | Schuetze | 219/227 |
| 2,924,694 | 2/1960 | Kreider | 156/579 |
| 3,234,356 | 2/1966 | Babb | 219/240 |
| 3,408,478 | 10/1968 | Penn | 219/229 |
| 3,673,030 | 6/1972 | Blanc de la Naulte et al. | 156/251 |
| 3,906,186 | 9/1975 | Szolis | 219/242 |
| 3,969,606 | 7/1976 | Veach | 219/237 |
| 4,176,273 | 11/1979 | Fujie et al. | 219/220 |
| 4,235,652 | 11/1980 | Brooks et al. | 156/579 |
| 4,238,665 | 12/1980 | Tremarco | 219/238 |
| 4,889,440 | 12/1989 | Shano | 401/1 |
| 5,346,580 | 9/1994 | Elges et al. | 156/579 |
| 5,374,806 | 12/1994 | Chou | 219/229 |
| 5,502,967 | 4/1996 | Nakagawa et al. | 219/229 |

FOREIGN PATENT DOCUMENTS

| | | | |
|---|---|---|---|
| 76798 | 6/1976 | Australia | 156/579 |
| 748982 | 6/1970 | Belgium | 156/579 |
| 1220326 | 6/1966 | Germany | 156/579 |
| 174205 | 3/1935 | Switzerland | 219/227 |
| 97926 | 4/1988 | Taiwan . | |
| 101608 | 7/1988 | Taiwan . | |

*Primary Examiner*—John A. Jeffery
*Attorney, Agent, or Firm*—Jeffer, Mangels, Butler & Marmaro LLP

[57] ABSTRACT

A pen base electric heat sealer including a power supply unit attached with a taper socket at one end to hold dry battery cells and a electric heat seal unit, the electric heat seal unit being separated from the bottom wall of the battery chamber of the power supply unit, and a cap with a clip covered on the taper socket for fastening, whereby the electric heat seal unit is electrically connected to the power supply unit to produce heat for sealing as it is pressed on the workpiece to be sealed; the electric heat seal unit is electrically disconnectted from the power supply unit to stop from producing heat as it is released from the pressure.

9 Claims, 8 Drawing Sheets 5,641,418

1

PEN BASE ELECTRIC HEAT SEALER

CROSS REFERENCE TO RELATED APPLICATION

This application is a continuation-in-part of application Ser. No. 08/080,762 filed Jun. 24, 1993, now U.S. Pat. No. 5,374,806, for "PEN BASED ELECTRIC HEAT SEALER". This application is also related to divisional application Ser. No. 08/323,387, filed Oct. 14, 1994.

BACKGROUND OF THE INVENTION

The present invention relates to a heat sealer, and more particularly to a pen base electric heat sealer for sealing polyethylene bags, etc. by heat.

A variety of electric heat sealing apparatus have been disclosed for industrial and home usees, and have appeared on the market. Among these electric heat sealing apparatus, stapler type electric heat sealing apparatus arre most popularly accepted by consumers. A stapler type electric heat sealing apparatus, exemplars of which are shown in U.S. Pat. No. 5,142,123 and Japanese Patent No. 63-57206, is generally comprised of a housing made in the form of a stapler. Because much storage space is needed, a stapler type electric heat sealing apparatus is not convenient for carrying with oneself as one of personal accessories. Another drawback of stapler type electric heat sealing apparatus is that the heating action must be employed twice when sealing the open side of a polyethylene bag. When sealing the open side of a polyethylene bag with a stapler type electric heat sealing apparatus, as illustrateed in FIG. 8, one end of the open side of the polyethylene bag is held in one hand as the other hand is holding the electric heat sealing apparatus to seal the bag. Therefore, the corner area of the open side of the polyethylene bag must be sealed later.

SUMMARY OF THE INVENTION

The present invention eliminates the aforesaid drawbacks. It is one object of the present invention to provide a pen base electric heat sealer which is as easy to use as a pen. It is another object of the present invention to provide a pen base electric heat sealer which is as easy to carry as a pen. It is still another object of the present invention to provide a pen base electric heat sealer which is automatically turned on to produce heat for sealing as it is pressed on the workpiece to be sealed, or turned off to stop from producing heat as it is released from the workpiece. The preseent invention uses a coil spring to separate the electric heating unit from the DC power supply unit. As the front end of the electric heating unit is pressed on the workpiece to compress the coil spring, the electric contacts on the electric heating unit become electrically connected to the two opposite contacts of the DC power supply unit, and therefore the electric heating unit is turned on. As the electric heating unit is released from the workpiece, the coil spring immediately pushes the contacts of the electric heating unit away from the contacts of the DC power supply unit. The cylindrical housing of the pen base electric heat sealer is attached with a cap having a clip convenient for hanging on the pocket.

2

Figure 3:
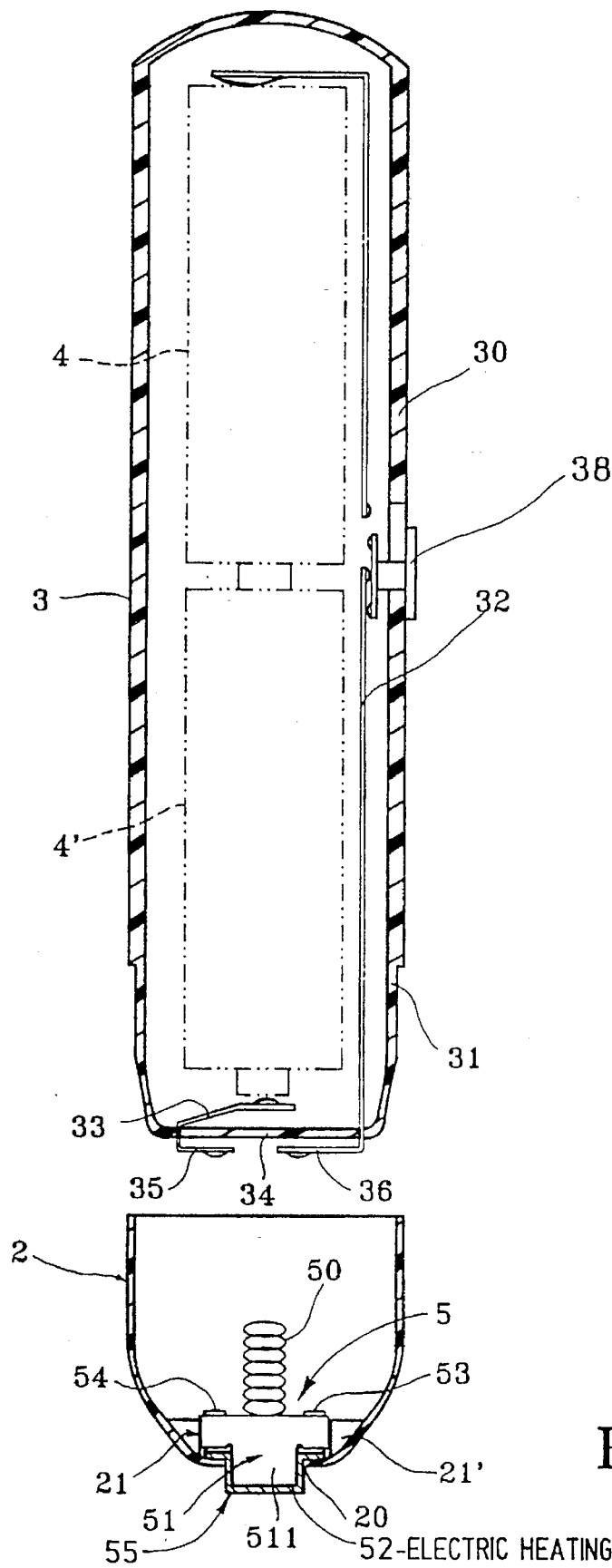
Figure 5:
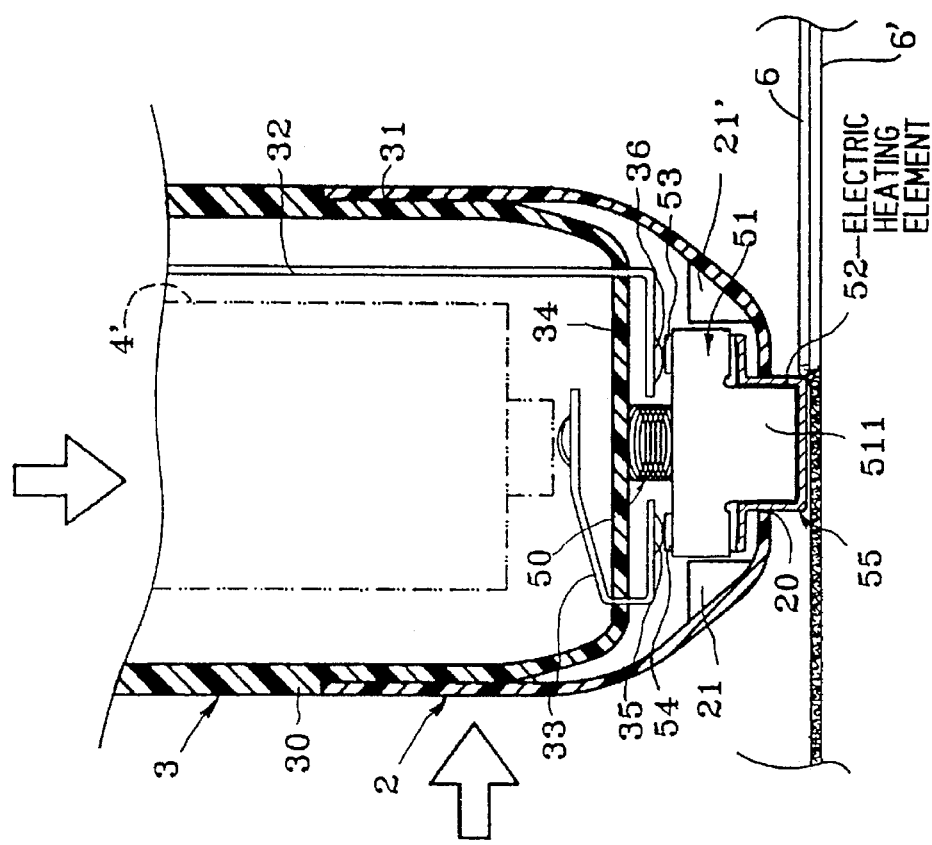
Figure 4:
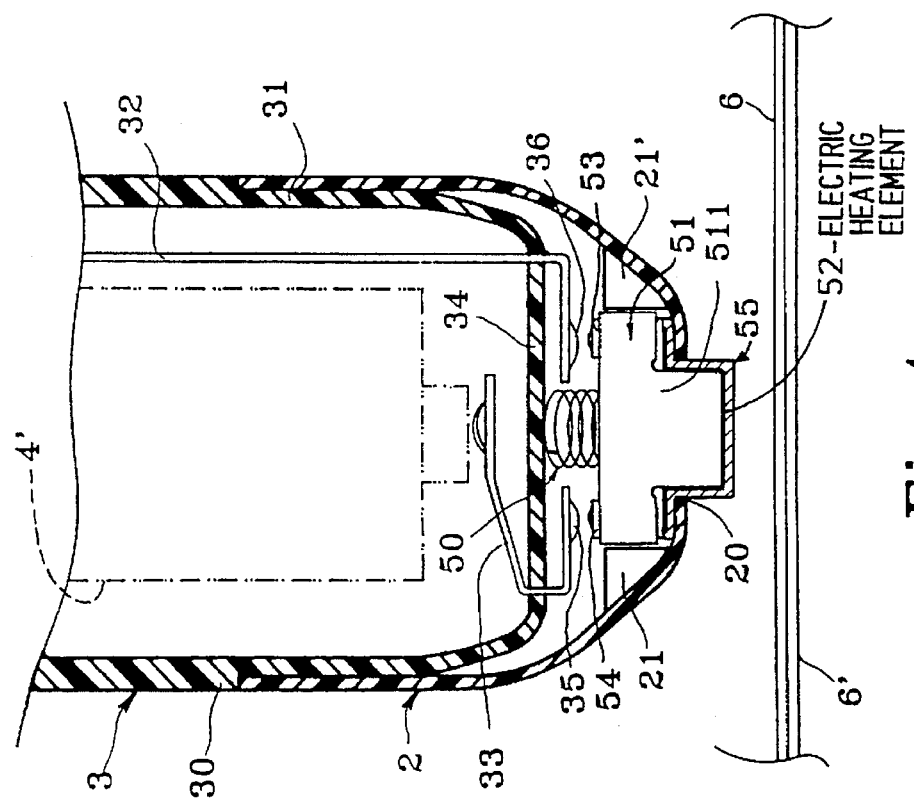
Figure 6:
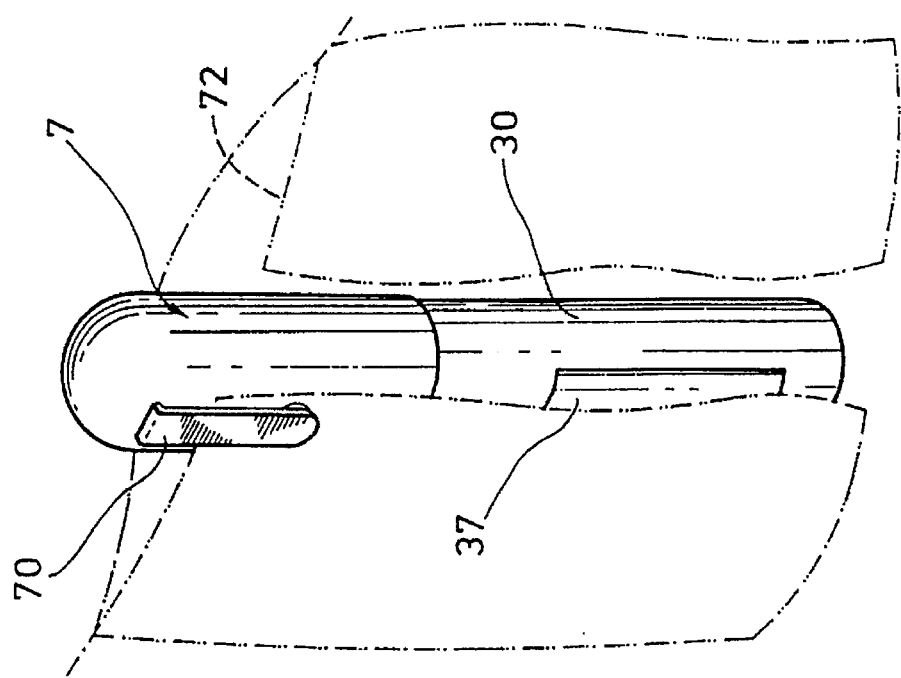
Figure 7:
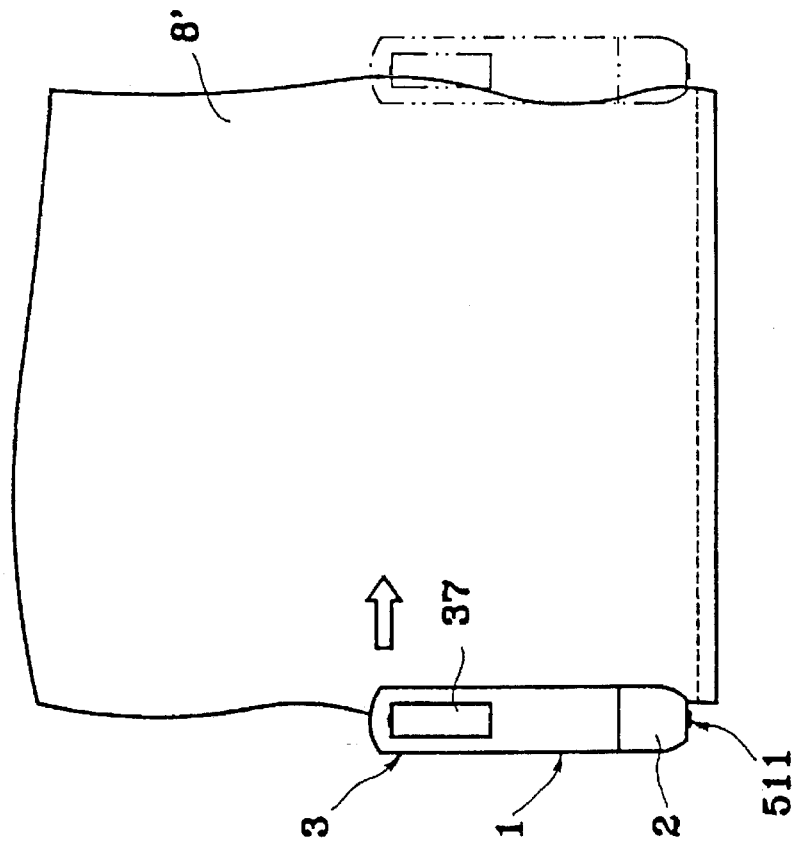
Figure 8:
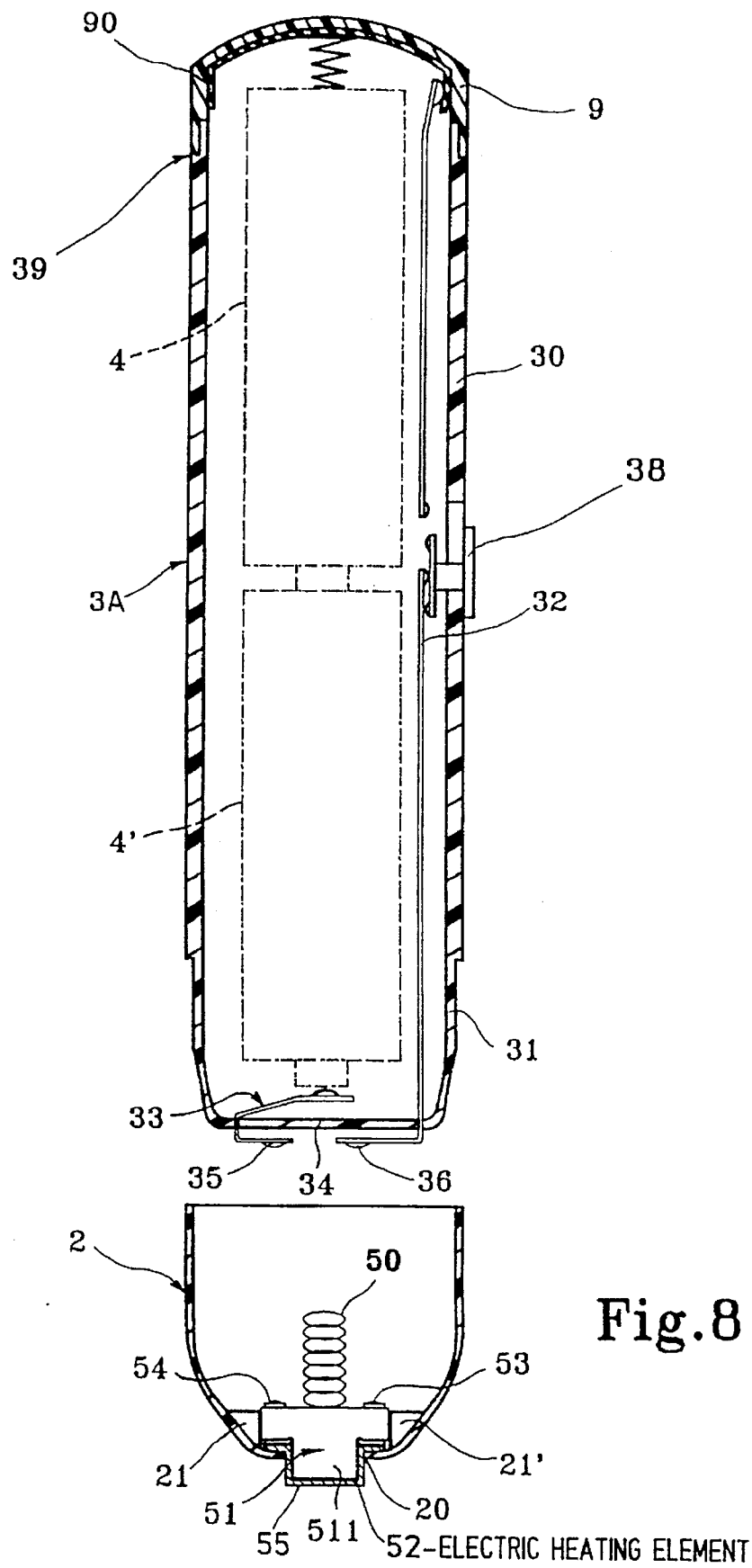
Figure 9:
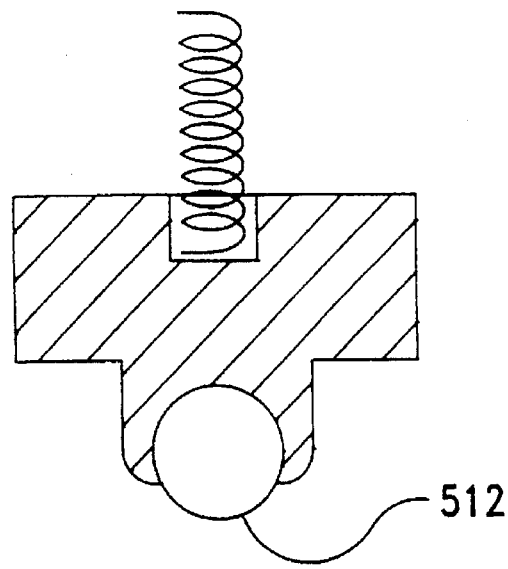
Figures 10, 10A:
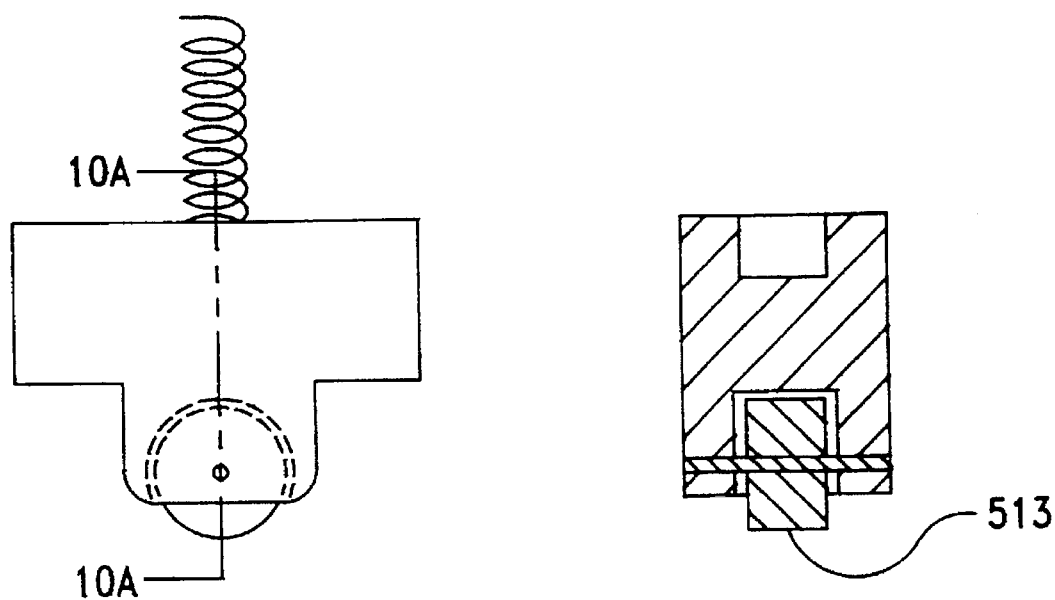

FIG. 3 is a longitudinal sectional view of the pen base electric heat sealer;

FIG. 4 is a partial sectional view of the pen base electric heat sealer showing the metal clamps of the electric heat seal unit disconnected from the contacts of the metal contact plates;

FIG. 5 is similar to FIG. 4 but showing the metal clamps electrically connected to the contacts of the metal contact plates;

FIG. 6 is a schematic drawing showing the pen base electric heat sealing fastened to the pocket by the clip on the cap thereof;

FIG. 7 is a schematic drawing showing the operation of the present invention in sealing the open side of a polyethylene bag through one stroke;

FIG. 8 is a longitudinal sectional view of an alternate form of the housing of the pen base electric heat sealer according to the present invention;

FIG. 9 ia another embodiment of the present invention which using a embed stainless ball for the sealing tip;

FIG. 10 is another embodiment of the present invention which using a roller for the sealing tip;

FIG. 10A is a sectional view taken on line 10A—10A of FIG. 10; and

Figure 11:
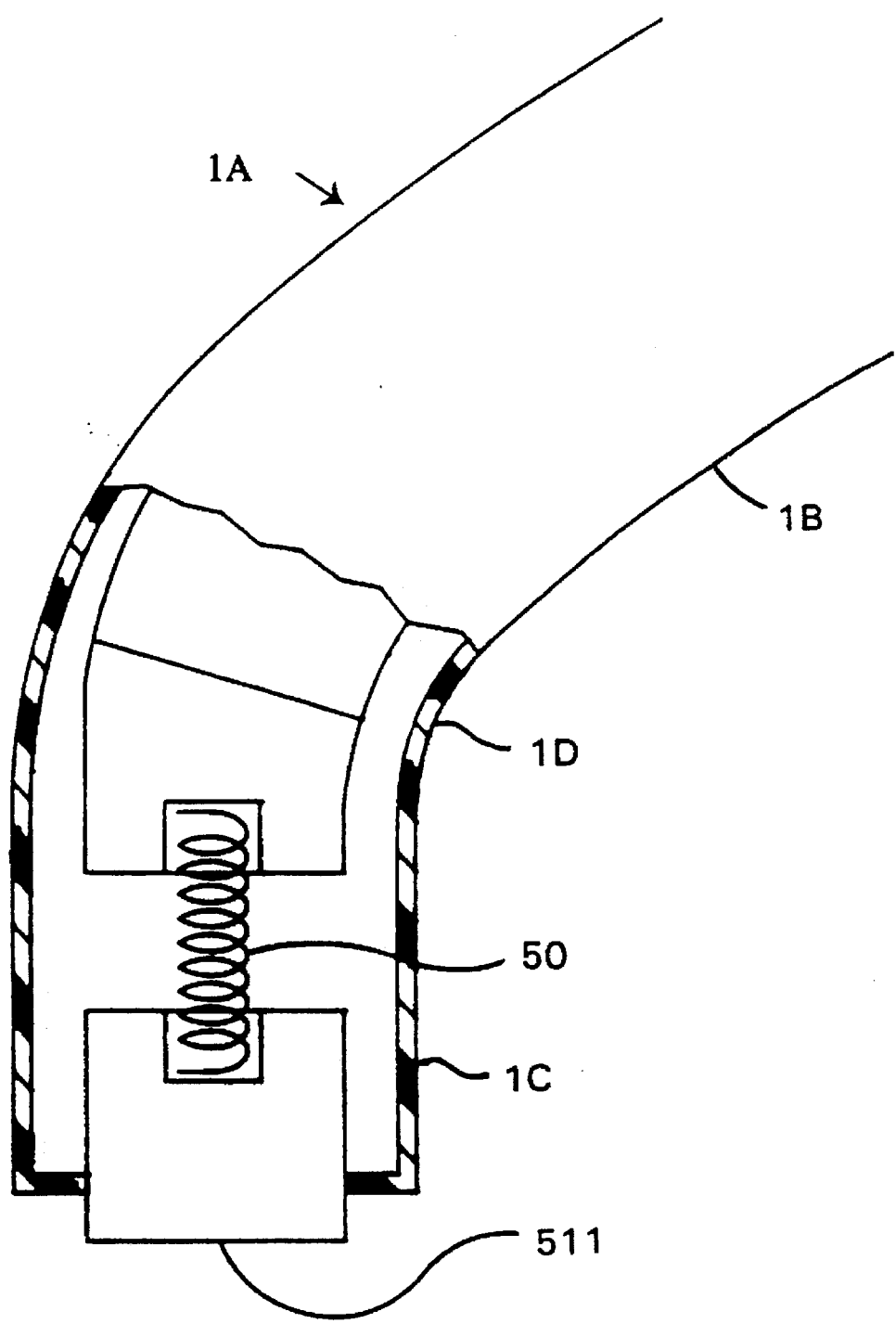

FIG. 11 is another embodiment of the present invention which having an elbow-shape on the sealing tip end of the pen.

DETAILED DESCRIPTION OF THE PREFERRED EMBODIMENT

Figure 1:
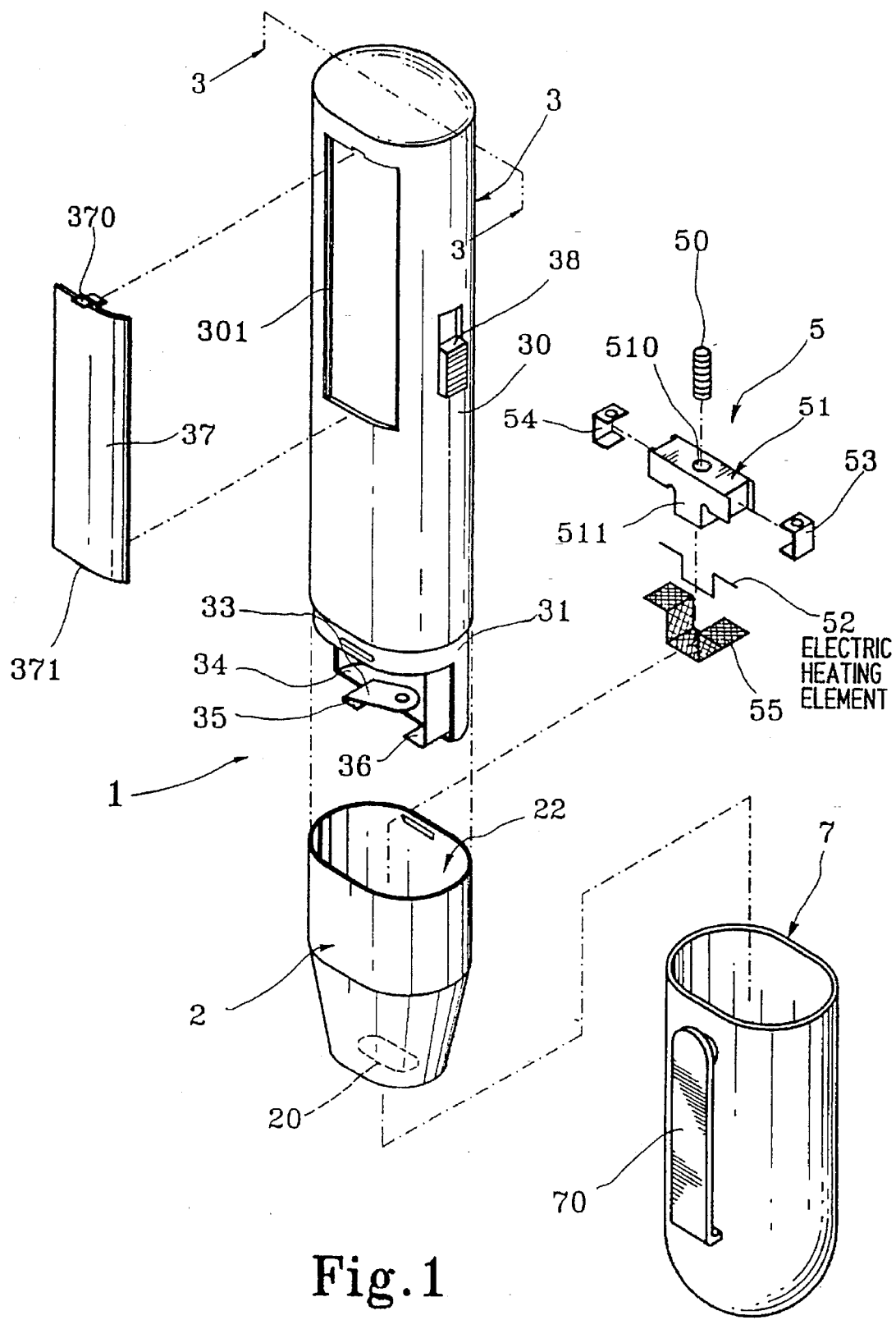
FIG. 1 is an exploded view of a pen base electric heat sealer according to the preferred embodiment of the present invention.
Figure 2:
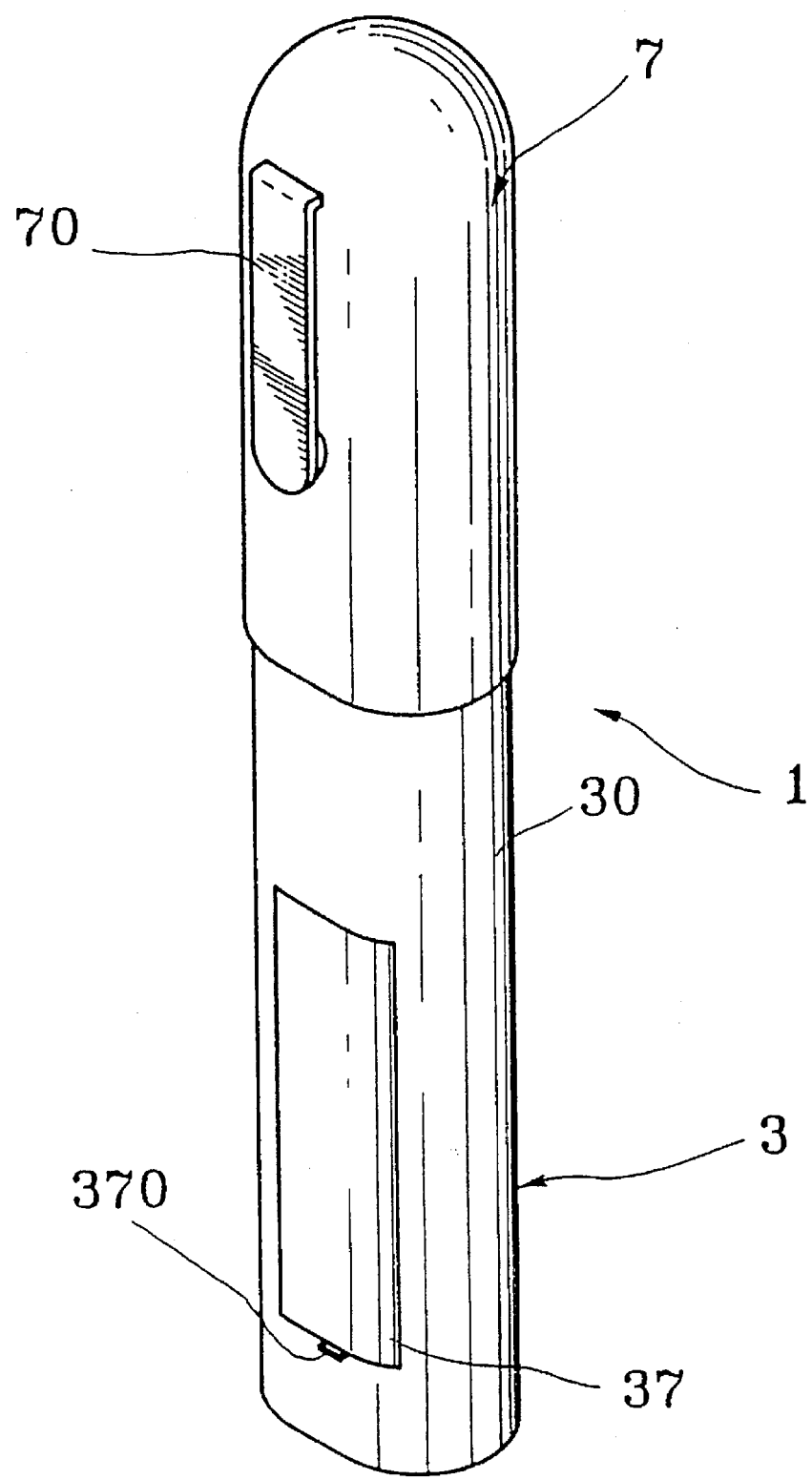
FIG. 2 is an elevational view of the pen base electric heat sealer.

Referring first to FIGS. 1, 2 and 3, a pen base electric heat sealer in accordance with the preferred embodiment of the present invention is generally comprised of a cylindrical housing 1 made in the shape of a pen convenient for the holding of the hand. The cylindrical housing 1 is comprised of a power supply unit 3 and an electric heat seal unit 5 longitudinally connected to the power supply unit 3 at one end. The power supply unit 3 comprises a cylindrical battery chamber 30, which receives two dry battery cells 4;4' connected in series (see FIG. 3), and a cylindrical connecting neck 31 in a relatively smaller outer diameter extended from the battery chamber 30 at one end for connecting the electric heat seal unit 5 in a flush manner.

The battery chamber 30 has an opening 301 for loading the dry battery calls 4;4' and a battery lid 37 detachably covered on the opening 301. The battery lid 37 has two retainers 370;371 on two opposite ends thereof for mounting on the opening 301.

The power supply unit 3 comprises two metal contact plates 32;33, each having one end connected to either pole of the dry battery cells 4;4' and an opposite end extended out of the bottom wall 34 of the battery chamber 30 and terminated to a respective contact 36 or 35. One metal contact plate 32 is connected in series to a power switch 38 for On/Off switching control. The bottom wall 34 of the battery chamber 30 is a division wall between the battery chamber 30 and the connecting neck 31

The electric heat seal unit 5 is received in a socket 2. Thw socket 2 has a top open end 22 in a relatively bigger diameter, into which the connecting neck 31 fits, and a bottom open end in a relatively smaller diameter terminated to a small opening 20. The electric heat seal unit 5 comprises a base 51 having a top center hole 510 and a convexly curved surface sealing tip 511, a coil spring 50 having one end inserted in the hole 510 on the base 51 and an opposite end stopped against the bottom wall 34 of the battery chamber 30 (see also FIG. 4), two metal clamps 53;54 bilatreally fastened to the base 51 at the top, anelectric heating wire 52 fastened between the metal clamps 53;54 and attached to the bottom edge of the bottom projecting block 511 being disposed 15 out of the socket 2 through the opening 20, a protective layer of heat-resisting fibers 52 covered over the electric heating wire 52 for protection.

Referring to FIG. 4, the electric heat seal unit 5 is retained inside the socket 2 between two stop blocks 21;21' with the coil spring 50 stopped against the bottom wall 34 of the battery chamber 30, and the metal clamps 53;54 are respectively spaced below the contacts 36;35. The stop blocks 211;21' are provided to guide the movement of the electric heat seal unit 5 along the longitudinal axis of the housing 1.

Referring to FIG. 5, as the switch 38 is switched on and the convexly curved surface sealing tip 511 of the electric heat seal unit 5 is pressed and slid on the plastic films 6;6' to be sealed. the metal clamps 53;54 become respectively connected to the contacts 36;35 to electrically connect the electric circuit, and therefore the electric heating wire 52 is heated to give heat through the protective layer of heat resisting fibers 55 for sealing the plastic films 6;6'. As soon as the sealing tip 511 of the electric heat seal unit 5 is removed from the plastic films 6;6'. the coil spring 50 immediately push the base 51 outwards, and therefore the metal clamps 53;54 are separated from the contacts 36;35 to disconnect the electric circuit. Therefore, the pen base electric heat sealer is as easy to use as a pen.

Referring to FIG. 6 and FIG. 1 again, there is provided a cap 7 with a clip 70 for covering the socket 2 and the electric heat seal unit 5 as the pen base electric heat sealer is not in use. By means of the clip 70, the pen base electric heat sealer can be fastened to a pocket.

Referring to FIG. 7, as the pen base electric heat sealer is as easy to use as a pen, sealing the open side of a polyethylene bag can be done in one stroke.

Referring to FIG. 8, therein illustrated is an alternate form of the power supply unit 3. The battery chamber 30 of the power supply unit 3 comprises a rear opening 39 covered with an end cap 9 for loading dry battery cells 4;4'. The end cap 9 has a conductor 90 on the inside. As the end cap 9 is fastened to the battery chamber 30 of the power supply unit 3, the conductor 90 and the metal contacts 32;33 and the dry battery cells 4;4' form into a closed circuit. This arrangement is designed to replace the aforesaid opening 301 and battery lid 37 for easy loading of the dry battery cells 4;4'.

Referring to FIG. 9, therein illustrated is another embodiment of the present invention which using an embedded stainless ball 512 for the sealing tip. The stainless ball 512 is carried by the base 51 of the heat seal unit 5 which is heatable by the power supply unit 3. The major purpose of using an embedded stainless ball for the sealing tip is reducing friction between the sealing tip and the plastic films, that is changing sliding friction to rolling friction, so that could avoid scratching the plastic films. And the ball tip could usefully for a small curvature sealing path.

Referring to FIG. 10 and FIG. 10A, therein illustrated are another embodiment of the present invention, which is similar to FIG. 9 but using a roller 513 for the sealing tip. The major purpose of using a roller is reducing friction and widen the sealing path. Futhermore, the rolling surface of the roller 513 could be embossed with trademark, advertising word or pattern for improving a sense of beauty or advertising-effect. The roller 513 is rotatable about an axle 513A carried by the base 51 of the heat seal unit 5.

Referring to FIG. 11, therein illustrated is another embodiment of the present invention which utilizes a sealing tip 511, as already described, and has an elbow-shape structure suitable for use in a hand-writing manner and which could be used in a narrow working space. More specifically, the embodiment of FIG. 11 includes a housing 1A having a main, battery-enclosing portion 1B and an end portion 1C. The housing 1A has a bend at 1D so as to form the mentioned elbow-shaped structure. As in the embodiments already described, the end portion 1C includes an opening 20A from which the sealing tip 511 projects.

I claim:

1. A hand held, self-contained, battery powered electric heat sealer comprising:

an elongated, generally pen-shaped housing including a battery power supply unit and having at one end electric terminal means connected to said power supply unit, said housing including a longitudinal axis and an end portion at said one end of the housing, said housing end portion having a plurality of stop blocks and an opening substantially centered on the axis and partially enclosing an electric heat seal unit, said electric heat seal unit including a heat sealing tip projecting from said opening in said housing end portion and a base portion which is retained by said housing end portion within said housing end portion, said heat sealing tip including a metallic, rotatable heat sealing element, said heat seal unit being movable axially within said housing end portion, said plurality of stop blocks aligning said heat seal unit within said housing along said axis and guiding said axial movement of said heat seal unit, said heat seal unit being arranged to engage said electric terminal means on said housing to complete an electric circuit between said power supply unit and said electric heat seal unit to heat said unit and said metallic, rotatable heat sealing element, a spring disposed between said one end of said housing and said heat seal unit, said spring axially biasing said heat seal unit toward said opening in said housing end portion a distance sufficient to separate said heat seal unit from said terminal means on said housing, axially directed pressure on said rotatable heat sealing element causing sufficient axial movement of said heat seal unit against said bias of said spring to cause said heat seal unit to engage said terminal means on said housing to complete said circuit between said power supply unit and said heat seal unit, release of said pressure causing axial movement of said heat seal unit under the urging of said spring to cause said heat seal unit and said terminal means to disengage and to break said circuit.

2. A heat sealer, as defined in claim 1, in which said housing has an elbow shape proximate said housing end portion.

3. A heat sealer, as defined in claim 1, in which:

a protective cap is detachably secured on said housing over said heat sealing tip.

4. A heat sealer, as defined in claim 3, in which:

said cap has a clip for holding the heat sealer while not in use.

5. A heat sealer, as defined in claim 1, including:

an on/off electric power switch connected between said battery powered supply and said heat seal unit.

6. An electric heat sealer, as defined in claim 1, in which: the rotatable heat sealing element comprises a ball.

7. An electric heat sealer, as defined in claim 1, in which: the rotable rotatable heat sealing element comprises a roller.

8. A heat sealer, as defined in claim 7, in which: the roller has an outer, rolling surface, said surface being embossed with a trademark, advertisement or pattern.

9. An electric heat sealer, as defined in claim 1, in which said base portion is unitary with said heat sealing tip.

* * * * *